United States Patent [19]

Rodrigues et al.

[11] Patent Number: 5,101,079
[45] Date of Patent: Mar. 31, 1992

[54] ENCLOSURE FOR AN ELECTRICAL TERMINAL BLOCK INCLUDING BARRIER MEANS FOR A CABLE ENTRY OPENING

[75] Inventors: Julio F. Rodrigues, Somerville; Adam Fischer, Jr., Basking Ridge, both of N.J.

[73] Assignee: Thomas & Betts Corporation, Bridgewater, N.J.

[21] Appl. No.: 551,587

[22] Filed: Jul. 11, 1990

[51] Int. Cl.$^5$ ............................................. H05K 5/00
[52] U.S. Cl. ...................................... 174/65 R; 248/56
[58] Field of Search ..................... 174/65 R, 59, 60; 248/56

[56] References Cited

U.S. PATENT DOCUMENTS

| | | | |
|---|---|---|---|
| 2,317,450 | 4/1942 | Folds et al. | 174/60 |
| 3,482,032 | 12/1969 | McVoy, Jr. | 174/65 |
| 3,523,156 | 8/1970 | Phillips, Jr. | 174/38 |
| 3,742,119 | 6/1973 | Newman | 174/65 |
| 4,414,427 | 11/1983 | Slater et al. | 174/65 |
| 4,641,905 | 2/1987 | Poliak et al. | 339/103 |
| 4,644,095 | 2/1987 | Bright et al. | 174/50 |
| 4,654,470 | 3/1987 | Feldman et al. | 174/50 |
| 4,962,989 | 10/1990 | Jung et al. | 350/96.20 |

OTHER PUBLICATIONS

Raychem Corporation brochure for D Terminator ™ PMT-50, 5/89.

*Primary Examiner*—Leo P. Picard
*Assistant Examiner*—David A. Tone
*Attorney, Agent, or Firm*—Robert M. Rodrick; Salvatore J. Abbruzzese

[57] ABSTRACT

An enclosure for an electrical terminal block includes a housing having a back wall and projecting side walls extending thereabout to form a bounded chamber. One side wall includes an opening formed therethrough for permitting passage of an electrical cable into the bounded chamber. A barrier member is supported by the side wall adjacent the opening. The barrier member includes a barrier wall at least partially surrounding the opening about a periphery thereof. The barrier member includes a pair of elongate oppositely directed deflectable fingers projecting inwardly from the barrier wall. Distal ends of the oppositely directed fingers overlap to close-off the opening.

17 Claims, 3 Drawing Sheets

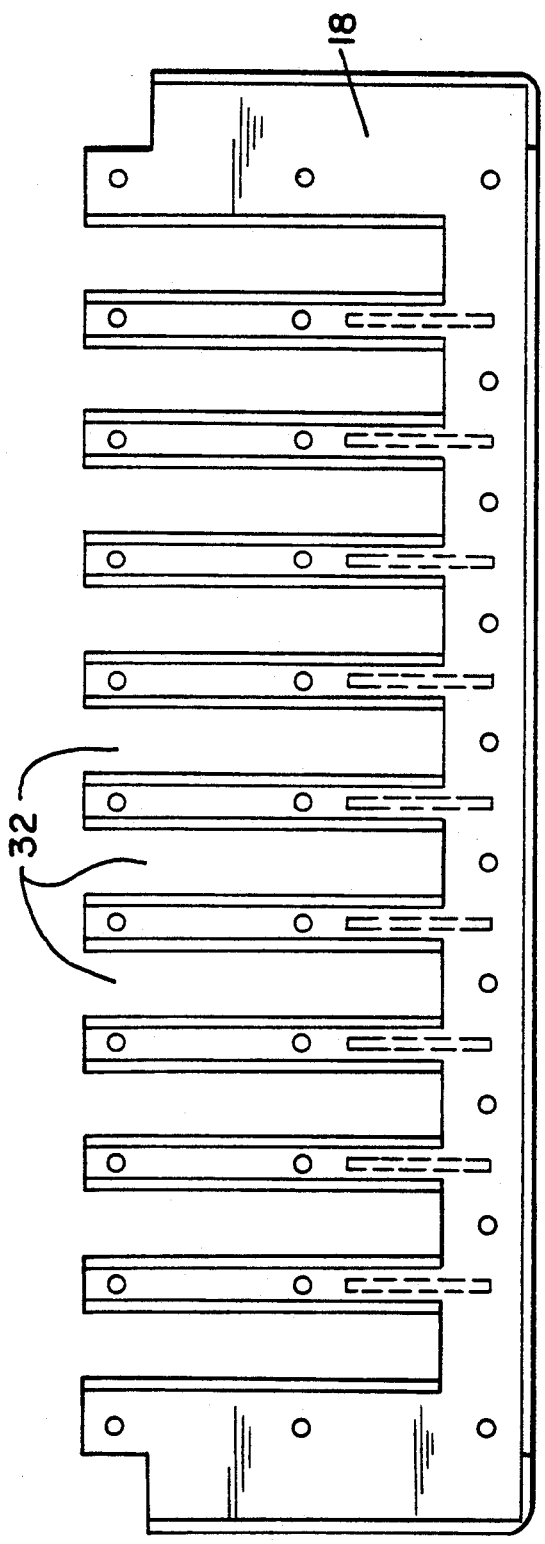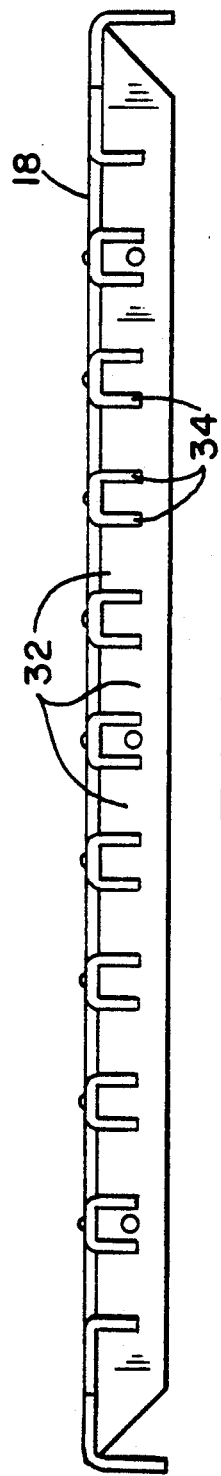
FIG. 2
FIG. 3

ENCLOSURE FOR AN ELECTRICAL TERMINAL BLOCK INCLUDING BARRIER MEANS FOR A CABLE ENTRY OPENING

FIELD OF INVENTION:

The present invention relates to an enclosure for an electrical terminal block, the enclosure having an opening therein which permits entry of an electrical cable. More particularly, the present invention relates to a barrier member which closes the cable entry opening.

BACKGROUND OF THE INVENTION

Electrical enclosures have long been used in both power transmission and telecommunications transmission to house devices which terminate electrical wires or cables. These terminal devices referred to as "terminal blocks", are supported inside the enclosure. Openings are provided through the enclosure so that electrical cables may be passed therethrough for electrical termination to the terminal blocks. When enclosures such as these are used outdoors, they are exposed to the elements. Water, which may enter the enclosure through the cable entry openings, could adversely affect the connections of the cables to the terminal block.

The art has seen a variety of barrier type devices which permit passage of the cable through the opening, yet restrict moisture passage therethrough. U.S. Pat. No. 3,523,156 shows an improved moisture barrier for an electrical pedestal. The device includes a rubber sealing member having openings therethrough in line with the cable entry openings. The opening in the sealing member surrounds the electrical cable in sealing engagement, restricting the tendency of water to track along the cable and into the enclosure. However, in order to prevent water from entering the cable entry opening when a cable is not inserted therethrough, a separate plug must be inserted therein. The limitations of such a separate plug are readily apparent.

Other enclosures include rubber sealing members including a thin membrane which spans the cable entry opening, thus effectively closing the opening when no cable is inserted therethrough. To provide cable access through a particular opening, the cable is inserted through the membrane to puncture the membrane, thus providing access to the interior of the enclosure. However, with these membrane-type sealing devices, once the cable is removed, the membrane is violated and water passage therethrough is not restricted.

It is desirable to provide an enclosure for an electrical terminal block having cable entry openings, which provides a moisture barrier at the cable entry opening. The moisture barrier should effectively restrict water from passing therethrough prior to cable insertion, while the cable is inserted and after the cable has been removed.

SUMMARY OF THE INVENTION

It is an object of the present invention to provide an enclosure for an electrical terminal block which permits entry of electrical cables through openings therein and which seals the openings, minimizing water passage therethrough.

It is a further object of the present invention to provide a barrier member for covering an opening in electrical terminal block enclosure. The barrier member should restrict water passage through the opening, yet permitting insertion and removal of an electrical cable therethrough.

In the efficient attainment of these and other objects, the present invention provides an enclosure for an electrical terminal block including a housing which supports the electrical terminal block therein. The housing includes an opening through a wall thereof to permit passage of an electrical cable therethrough. Barrier means supported by the wall adjacent the opening includes a barrier wall at least partially surrounding the opening about a periphery thereof. A pair of elongate oppositely directly deflectable fingers project inwardly from the barrier wall into the opening. Distal ends of the oppositly directed fingers overlap to close-off the opening.

As particularly shown by way of a preferred embodiment herein, the present invention provides an enclosure including a terminal box defined by a back wall, side walls and a cover. One of the side walls includes a plurality of longitudinal cable entry slots, which provide passage for plural electrical cables. Each slot includes a longitudinal extent and a transverse extent. Barrier means covers the cable entry slots and includes barrier fingers which extend transversely along each longitudinal side of the slot and inwardly toward each other. Distal extents of the fingers extend beyond the center of the slot to overlap each other to close-off the slot.

BRIEF DESCRIPTION OF THE DRAWINGS

FIGS. 2 and 3 show in bottom and front plan views respectively, one wall of the enclosure of FIG. 1.

DETAILED DESCRIPTION OF THE PREFERRED EMBODIMENT

Figure 1:
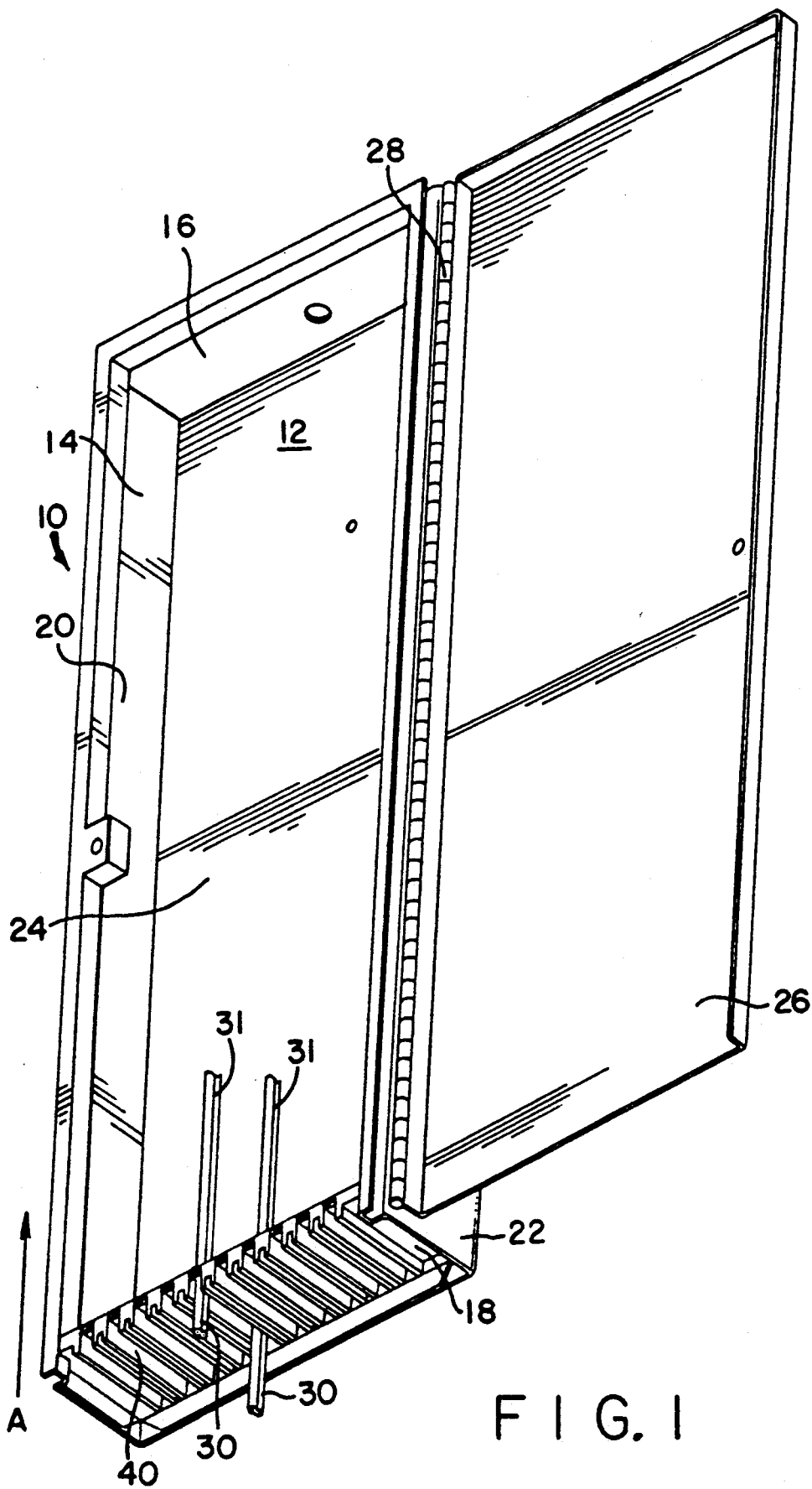
FIG. 1 is a perspective showing of an enclosure for an electrical terminal block in accordance with the present invention.

Electrical enclosure 10 of the present invention is typically a box-type member formed of sheet metal or similar material. Enclosure 10 is formed to have a flat planar back wall 12 and a substantially continuous side wall 14 projecting therefrom. Side wall 14 may be integrally formed or, as shown in the embodiment of FIG. 1, may include discrete upper and lower wall segments 16 and 18, as well as side-by-side wall segments 20 and 22. Back wall 12 and side wall 14 define a bounded chamber 24 interiorly thereof, which is designed to support therein an electrical terminal block (not shown) used for electrical interconnections. Enclosure 10 further includes a plate-like cover 26 hingedly attached to side wall segment 22 with hinge 28. Cover 26 is opened to access the terminal block housed in chamber 24 and may be closed to provide a completely bounded closure. Enclosure 10 permits entry of electrical cables 30 thereinto for electrical termination with the terminal block supported in chamber 24.

Referring to FIGS. 2 and 3, cable access is provided by a plurality of slots 32 located through lower wall segment 18. Each of slots 32 is an elongate member having a generally rectangular shape. Each slot is defined by a longitudinal dimension as well as a transverse dimension. As particularly shown in FIG. 3, lower wall segment 18 includes depending stiffener members 34, which provide rigidity to the lower wall segment 18 between slots 32. Slots 32 are arranged in spaced side-by-side orientation along lower wall segment 18. This permits insertion of the plural electrical cables into enclosure 10.

Referring again to FIG. 1, typical cable insertion occurs by inserting the end of 31 of electrical cable 30 in a direction along the longitudinal axis of enclosure 10 (arrow A). One or more electrical cables 30 may be inserted through each slot 32. In typical use, enclosure 10 is installed outdoors either on a utility pole or as part of an above-ground pedestal. Therefore, provisions must be made to restrict water from tracking through slots 32 provided for insertion of electrical cable 30.

Figure 4:
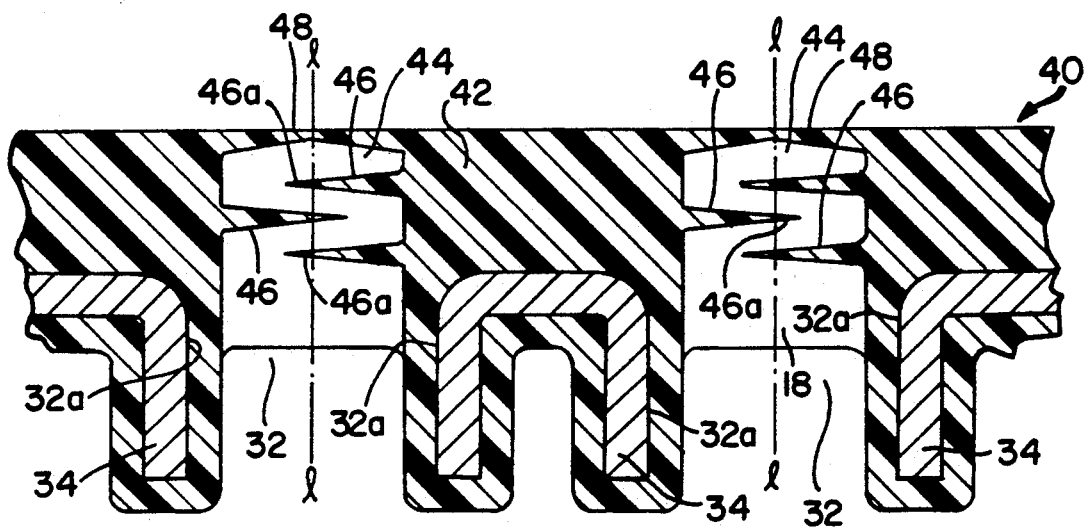
FIG. 4 is a partial sectional showing of the wall of FIG. 2 including an insulative barrier member molded therearound.
Figure 5:
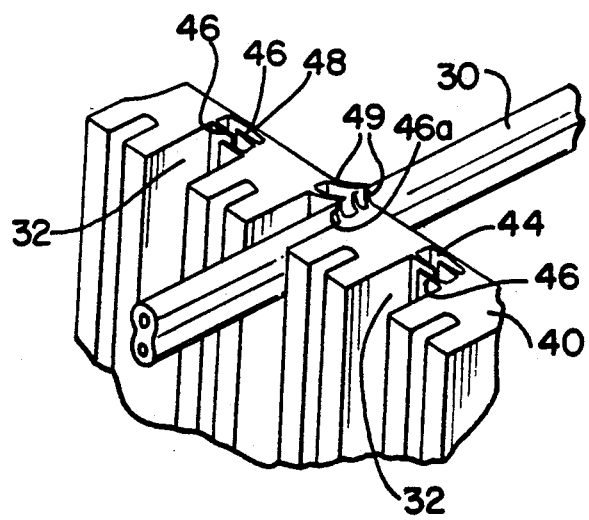
FIG. 5 is a partial perspective showing of the wall and the barrier member of FIG. 4 with an electrical cable inserted therein.

The present invention employs a barrier member 40 which is molded about lower wall segment 18. Referring to FIGS. 4 and 5, barrier member 40 is formed of a suitable elastomer or rubber. Barrier member 40 is molded in direct adherence to lower wall segment 18 to cover slots 32, as well as depending stiffener members 34. Barrier member 40 is formed to have an upper surface 42 extending over and across all of slots 32. Barrier member 40 further includes a location 44 of reduced thickness adjacent to and over each of slots 32. Each of locations 44 is formed to have a plurality of inwardly directed fingers 46. As shown in FIG. 4, fingers 46 extend from opposed peripheral longitudinal edges 32a of slots 32 inwardly toward each other. At least one finger 46 extends from each longitudinal edge 32a. In the present invention three inwardly directed fingers 46 are shown adjacent each slot 32. However, this number may vary. Each finger 46 extends more than halfway across the transverse extent of slot 32. Thus opposed adjacent fingers 46 overlap at distal extents 46a thereof. The center line 1 of each slot 32 is shown in FIG. 4. Distal extents 46a of fingers 46 extend beyond this center line 1. The overlapping of distal extents 46a of fingers 46 serves to close-off slots 32, preventing the inward migration of water therethrough. Inwardly directly fingers 46 essentially define a zigzag path which impedes the flow of water through slots 32.

A further feature of the present invention is shown in FIG. 4. Upper surface 42 of barrier member 40 includes a thin membrane 48 directly over each slot 32 Membrane 48 covers slot 32, completely closing off the slot as long as no electrical cable 30 is inserted therethrough. Thus, any one of slots 32 which is unused will be completely sealed against water propagation therethrough. Membrane 48 is relatively thin and easily puncturable by the insertion of cable 30 therethrough, to permit access to the interior of enclosure 10 (FIG. 1).

Referring to FIGS. 1 and 5, it can be seen that electrical cable 30 may be inserted through slot 32 from below along the direction of arrow A. Upon insertion, each of distal ends 46a of fingers 46 contacts cable 30. Membrane 48 is ruptured upon insertion of cable 30 therethrough. The distal ends 46a of fingers 46, as well as the newly formed finger portions 49 adjacent the ruptured membrane 48, will deflect and bear against cable 30 in sealing relation to prevent water from tracking along the cable 30 and into enclosure 10. If during subsequent use cable 30 is removed, fingers 46 will deflect back to their original position shown in FIG. 4, where the distal ends 46a again extend beyond center line 1 to overlap one another, closing off slot 32 and restricting water from entering enclosure 10.

Various changes to the foregoing described and shown structures would now be evident to those skilled in the art. Accordingly, the particularly disclosed scope of the invention is set forth in the following claims.

I claim:

1. An enclosure for an electrical terminal block and electrical cables terminated to said terminal block, said enclosure comprising:

a housing having a back wall and a side wall projecting therefrom and extending thereabout to form a bounded chamber interiorly thereof, said terminal block being supported within said chamber;

said side wall including an opening formed therethrough for permitting passage of an electrical cable into said bounded chamber;

barrier means supported by said side wall adjacent said opening, said barrier means including a barrier wall at least partially surrounding said opening about a periphery thereof and a pair of elongate oppositely directed deflectable fingers projecting inwardly from said barrier wall into said opening, distal ends of said oppositely directed fingers overlapping to close-off said opening; and a cover movably supported by said side wall for enclosing said terminal block.

2. An enclosure in accordance with claim 1 wherein said deflectable fingers of said pair are vertically spaced.

3. An enclosure in accordance with claim 1 wherein said barrier means includes an additional deflectable finger extending from said barrier wall vertically spaced from and substantially parallel to one finger of said pair, said additional deflectable finger having a distal end overlapping said distal end of the other finger of said pair.

4. An enclosure in accordance with claim 1 wherein said barrier means includes a puncturable membrane spanning said opening to additionally close-off said opening.

5. An enclosure in accordance with claim 4 wherein said membrane is puncturable upon said passage of said electrical cable therethrough.

6. An enclosure in accordance with claim 1 wherein said opening formed through said side wall is an elongate slot having a transverse extent defined by spaced apart longitudinal slot side edges.

7. An enclosure in accordance with claim 6 wherein said barrier wall extends along said slot side edges, said pair of deflectable fingers extending along the longitudinal extent of said slot to close-off said slot transverse extent.

8. An enclosure in accordance with claim 7 wherein said barrier means includes an additional deflectable finger extending from said barrier wall spaced from and substantially parallel to one finger of said pair, said additional finger having a distal end overlapping said distal end of the other finger of said pair.

9. An enclosure in accordance with claim 7 wherein said barrier means includes a puncturable membrane spanning said traverse extent of said slot, said membrane being puncturable upon insertion of said cable in said slot.

10. An enclosure in accordance with claim 6 wherein said slot permits accommodation of plural electrical cables.

11. An electrical enclosure comprising:

a box including a back wall, side walls and an cover defining a chamber therein for supporting an electrical terminal device;

a plurality of longitudinal cable entry slots spaced along one of said side walls for providing passage for plural electrical cables, each of said slots having a longitudinal extent extending along a longitudinal center line and a transverse extent; and barrier means covering said cable entry slots, said barrier means including a barrier finger extending transversely from each longitudinal side of each said slot, each of said fingers extending beyond the longitudinal center line of each said slot.

12. An electrical enclosure of claim 11 wherein said barrier means includes a puncturable membrane across each said slot transverse extent, each said membrane being puncturable upon said passage of one of said plural electrical cables therethrough.

13. An electrical enclosure of claim 12 wherein said barrier fingers are resiliently deflectable for permitting passage of said electrical cables therethrough.

14. An electrical enclosure of claim 13 wherein said barrier fingers include distal extents for sealing engagement with said cables upon said passage therethrough.

15. A barrier for covering an opening in an electrical box, said opening being defined by spaced peripheral edges on opposed sides of a center point, said barrier comprising:

a first barrier finger extending from one peripheral edge of said opening, an end portion of said first barrier finger extending beyond said opening center point; and a second barrier finger extending from another peripheral edge of said opening, an end portion of said second barrier finger extending beyond said center point, said end portions of said first and second barrier fingers overlapping to close-off said opening.

16. A barrier of claim 15 further including a third barrier finger extending from one peripheral edge of said opening, an end portion of said third barrier finger extending beyond said center point.

17. A barrier of claim 16 further including a puncturable membrane extending across side opening.

* * * * *